Figure 1:
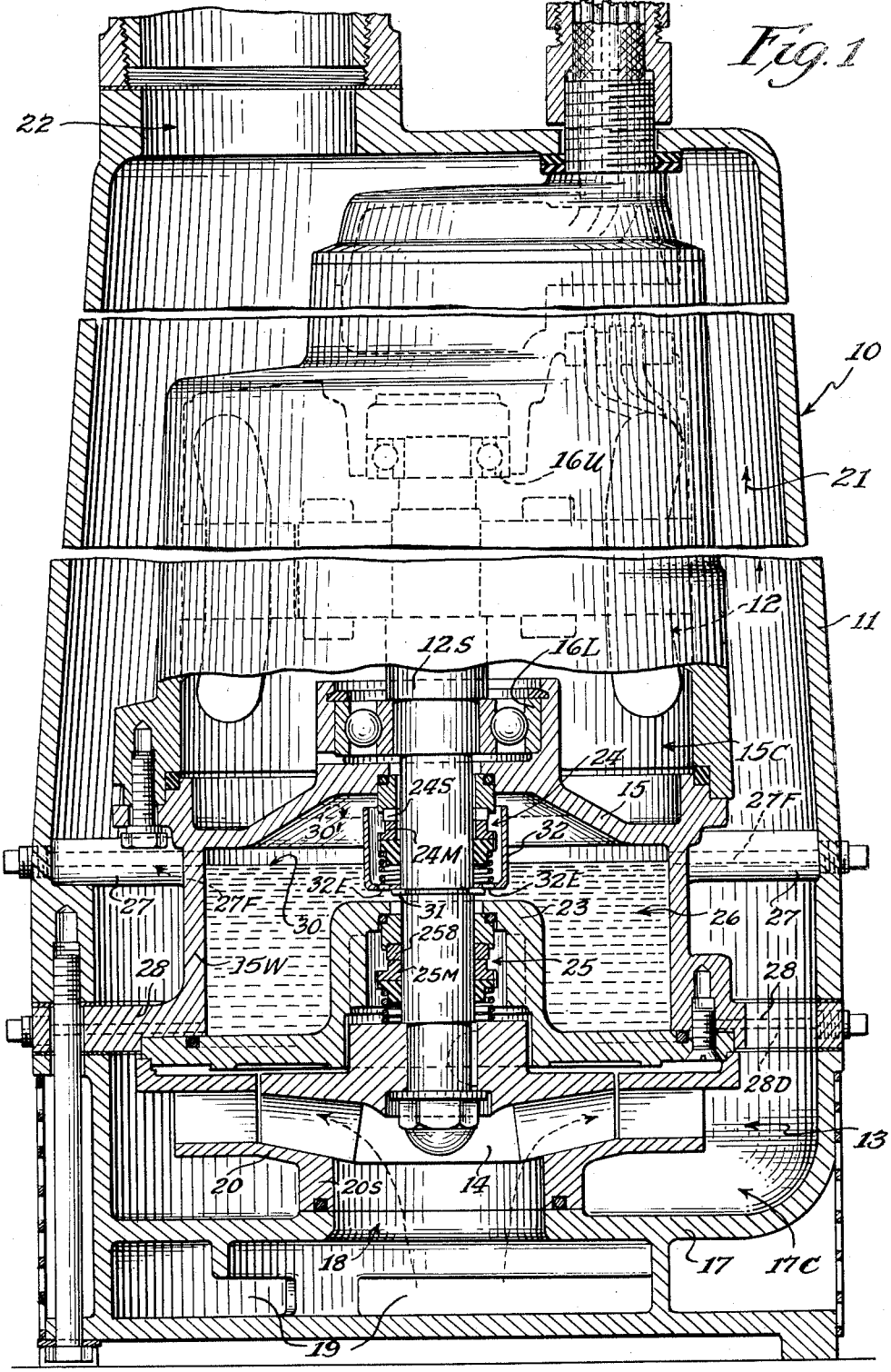

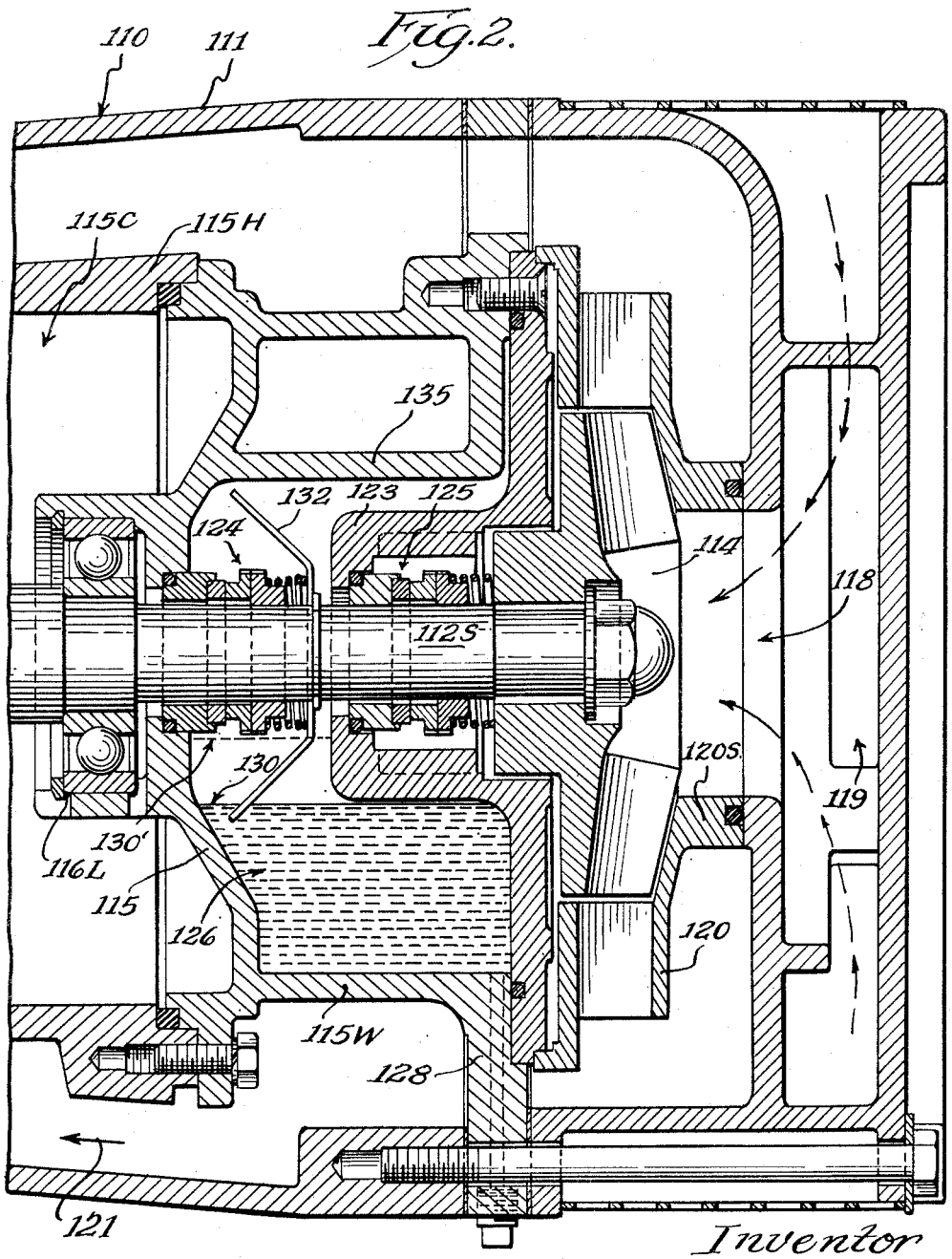

United States Patent Office 3,153,382
Patented Oct. 20, 1964

3,153,382
SUBMERSIBLE MOTOR-PUMP UNIT
James P. Van Blarcom, Jr., Ridgewood, N.J., assignor to International Telephone and Telegraph Corporation, New York, N.Y., a corporation of Maryland
Filed May 24, 1962, Ser. No. 197,343
11 Claims. (Cl. 103—87)

This invention relates to a submersible dry type motor-pump unit and more patricularly is concerned with an improved lubricatnt chamber and shaft seal arrangement for such a unit to prevent all leakage into the electric motor and motor bearings of the liquid being pumped.

In the past, submersible motor-pump units employing a dry motor with double shaft seals have been proposed, and these have, in general, been unsatisfactory because of liquid transfer caused by the differential in pressure that exists between the pump interior and the motor interior. In the presence of unbalanced liquid pressure, most shaft seals tend to wick to some degree and this allows some liquid transfer even if the seal is sound.

The principal object of the invention is the provision of a lubricant chamber and shaft seal arrangement for such a unit for accomplishing equalization of pressure between the lubricant chamber and the motor interior if one of the seals should fail or between the lubricant chamber and the pump interior if the other seal should fail, all without permitting any applicable transfer of liquid through the seals.

Another object of the invention is the provision in such an arrangement of facilities for providing adequate lubrication for the sealing surfaces.

Another object of the invention is the provision of an improved submersible type motor-pump unit employing a dry motor protected by a double shaft seal arrangement that can function acceptably even if one of the seals should fail.

Still a further object of the invention is the provision of facilities affording easy detection and removal at normal maintenance periods of any previous leakage.

Generally speaking, in accordance with the present invention, the desired pressure equalization is obtained with a double shaft seal arrangement in which the upper shaft seal is located in an intermediate lubricant chamber and is normally isolated from liquid under pressure to avoid excessive wicking action, with a slinger being provided in the lubricant chamber to supply lubricant continuously to the otherwise isolated upper seal.

Other objects and advantages will become apparent during the course of the following description.

In the accompanying drawings forming a part of this specification and in which like numerals are employed to designate like parts throughout the same:

FIG. 1 is a side view, partly in elevation and partly in section, illustrating a submersible motor-pump of the vertical shaft type constructed in accordance with this invention, with a portion of the height of the pump being omitted to facilitate the illustration; and FIG. 2 is a similar view of a unit of the horizontal shaft type.

Referring now to the drawings, a vertical shaft type submarsible motor-pump unit is designated generally at 10 in FIG. 1 and it includes a vertically oriented casing 11 having a motor element 12 disposed in its upper end with the output shaft 12S thereof oriented vertically and disposed approximately centrally in the casing 11, and having a pump element 13 disposed across the lower end of the casing and including an impeller 14 fixed to the free end of the drive shaft in downwardly spaced relation to the lower end cap 15 of the motor housing. Motor shaft bearings 16U and 16L, respectively, are shown within the motor chamber 15C. The motor is of the dry type, and hence its windings and bearings are subject to serious damage if liquid, such as water, being handled by the unit should gain access to the motor chamber 15C.

The lower end of the casing 11 is in the form of a pump housing element 17 which forms the pump pressure chamber 17C and which is provided with an inlet passage 18 opening into the eye of the impeller 14. The pump housing 17 has a hollow lower region provided with peripheral side wall openings 19 leading to the pump inlet passage 18. A diffuser ring 20 is mounted within the pump housing 17 in encircling relation to the impeller 14 and it has an axial stub 20S that in part defines the inlet passage 18. The motor housing 15H is disposed within the casing 11 with side clearance affording a discharge passage 21 leading from the pump pressure chamber 17C along the side walls of the casing to a discharge opening 22 provided at the upper end of the casing. Since the pump is normally submerged in the liquid that it is to handle, there is liquid acting continuously to flow around the impeller 14 and then upwardly along the shaft 12S, and the purpose of this invention is to prevent leakage of liquid into the motor chamber 15C.

A double shaft seal arrangement is shown in FIG. 1 and includes an upper seal ring unit 24 and a lower seal ring unit 25. Each unit has relatively rotatable cooperating seal ring parts encircling the shaft. At the upper unit 24, the part 24S which is to be stationary relative to shaft rotation is suitably mounted in a wall 15 that forms the bottom end of the motor housing, while its companion ring 24M is mounted to rotate with the shaft. In the lower seal ring unit 25, the seal ring 25S which is stationary relative to shaft rotation is suitably mounted in the seal well wall structure 23 while the movable ring 25M is mounted to rotate with the shaft. The lower housing wall 15 of the motor has a depending cylindrical wall 15W and the seal well plate 23 spans and is sealingly secured across the lower end of this cylindrical wall 15W to define cooperably therewith a lubricant chamber 26 having the upper seal ring unit 24 disposed adjacent its upper end. The wall 15W carries an upper set of radial arms 27 suitably bored to provide fill passages 27F for supplying lubricant to the chamber 26, and has a similar set of radial arms 28 at its lower end suitably bored to provide drain passages 28D leading from the lubricant chamber 26. These radial arms also serve as structural reinforcement for the assembly.

The upper seal ring unit 24 is disposed in the lubricant chamber 26 whereas the lower seal ring 25 is disposed in the seal well cavity defined by the seal well plate 23.

The normal oil level for the lubricant chamber is indicated at 30 and the fill passages 27F are preferably located at this level to facilitate accurate fill. If desired, the fill level could be attained by premeasuring rather than by location of the fill passages.

The motor shaft 12S, at a location thereof within the lubricant chamber 26, is suitably formed to receive a snap ring 31 that serves to mount a slinger cup 32 to the shaft for rotation jointly therewith. The slinger cup 32 has oil entry openings 32E leading to its interior, and its rotation causes oil to be thrown throughout the region occupied by the upper seal unit 24 and causes an oil spray or vapor to be thrown against all the walls in the dome-shaped upper end of the lubricant chamber 26.

When the pump is at rest, and assuming proper sealing being developed at each of the seal units 24 and 25, the space in the lubricant chamber 26 above the normal oil level line 30 is occupied by air at atmospheric pressure. During normal operation, motor heat causes an increase in pressure in the motor chamber 15C and over long periods of operation even minute leakage past the seal surfaces of the upper seal unit 25 results in a like pressure in the lubricant chamber 26. This pressure equalization between the lubricant chamber and the motor chamber is not detrimental as this pressure acts on the oil overlying the upper end of the lower seal unit 24 to balance the effect of the pump impeller 14 which develops a pressure acting on the underside of the lower seal unit 25.

When the pump is stopped and the motor cools, a reduction in pressure or even a partial vacuum occurs in the motor chamber 15C. This reduction of pressure within the motor chamber allows the pressure acting in the lubricant chamber 26 to develop a minute flow of air back into the motor chamber, but this interchange of air through the upper seal unit 24 does not result in loss of lubricant. Even if the upper seal unit 24 should fail the interchange of air between the motor chamber and the lubricant chamber while more rapid does not lead to any serious condition.

During standby while the entire motor pump unit is submerged in the liquid that is to be pumped, and hereafter water will be assumed, a hydrostatic pressure acts on the motor pump unit. Now, assuming a leak at the lower seal 25, water is allowed to enter the lubricant chamber 26. Assuming the water has a higher specific gravity than the lubricant, water occupies the bottom of the lubricant chamber, thus causing the lubricant to rise to a new level indicated at 30' in the lubricant chamber. The air trapped in the top of the lubricant chamber, assuming the upper seal 24 is sound, will be compressed into the volume above the level 30'.

To realize these liquid level relationships, the pump should not be submerged to a depth greater than some predetermined shut-off head. In the event greater than anticipated maximum pressures are encountered, entrance of some lubricant into the motor housing will not damage the motor bearings. Water cannot reach the motor housing unless both seals leak appreciably. Any accumulation of water within the lubricant chamber 26 may be drained away during periodic preventive maintenance.

Prolonged protection of the motor bearings and windings can be assured by properly proportioning the volume relationships in the upper end of the lubricant chamber 26.

Using a maximum head pressure value as determined by the shut-off head, the volume relationships in the lubricant chamber 26 are determined by $$V_2 = V_1 \times \frac{\text{atmospheric pressure}}{\text{maximum pump pressure}}$$

where $V_1$ is the volume in the lubricant chamber 26 above the line 30, and $V_2$ is the volume in the lubricant chamber 26 above the line 30'.

These relationships are attained by providing a dome-shaped region in the top of the lubricant chamber.

The invention is embodied in a submersible motor pump unit of a horizontal shaft type as illustrated in FIG. 2. The basic construction is similar to that previously described and corresponding parts are designated by identical reference numbers in the 100 series. In this construction, the slinger cup 132 is flared to a greater radial dimension to permit establishing a normal lubricant level at a line 130 which is well below the sealing surfaces of the seal unit 124. The relatively low lubricant level 130 allows substantial rise of the lubricant level in the lubricant chamber 126 in the event of a leak at seal unit 125. The corresponding upper lubricant level is indicated at 130' in FIG. 2. Solid lubricant transfer between the lubricant chamber and the motor chamber is not possible so long as seal 124 is sound. The upper region of the lubricant chamber is reduced in volume, as necessary, by providing an internal wall configuration 135 that occupies most of the upper region of the lubricant chamber. It may also be noted that the slinger cup 132 need not have entrance holes in order to permit it to pick up and throw oil through the lubricant chamber for continuously maintaining required lubrication of the seal unit 24. The unit 125 is lubricated by the liquid in the seal well plus any oil or lubricant which may deposit on the drive shaft 112S and travel therealong to the region of seal 125.

It should be understood that the description of the preferred form of the invention is for the purpose of complying with Section 112, Title 35, of the U.S. Code and that the appended claims should be construed as broadly as the prior art will permit.

What is claimed is:

1. In a submersible motor-pump unit of the type that includes a dry type motor element disposed in a protective housing and having a drive shaft projecting through end wall structure of said housing and a pump element having a pump housing providing a pump chamber, seal well wall structure spanning said pump chamber and providing a seal well through which the drive shaft extends, and an impeller disposed in said pump chamber and secured on said drive shaft, said pump housing having an intake passage adapted to communicate with liquid in which the unit is submerged, said intake passage leading into said impeller, and said pump housing providing a discharge outlet passage leading from said pump chamber, a first rotary shaft seal assembly disposed in said seal well to provide a seal between the shaft and the seal well wall structure, intermediate wall structure engaged between said motor housing and said pump housing to provide a lubricant chamber therebetween, and having a normal liquid level to define a gas pocket within an upper region of said lubricant chamber, a second rotary shaft seal assembly disposed in said lubricant chamber at a region thereof overlying much of the volume of said gas pocket, and means mounted in said lubricant chamber and responsive to rotation of said shaft to supply lubricant to said second seal assembly during operation of said unit.

2. The arrangement of claim 1 wherein the last named means therein comprises a slinger cup secured on the shaft at a location in the lubricant chamber such that a portion of the slinger cup is located below the normal lubricant level and another portion of the slinger cup is located above the normal lubricant level.

3. The arrangement of claim 1 wherein said motor pump unit is oriented vertically with the motor element at the top and the pump element at the bottom and with the lubricant chamber having a dome-shaped upper region.

4. The arrangement of claim 1 wherein said motor pump unit is of the horizontal type with said motor element disposed horizontally alongside said pump element and with said lubricant chamber having an upper end region extending endwise between the motor element and pump element.

5. In a seal arrangement for a submersible motor-pump unit that includes a casing containing a motor housing at its upper end, a motor in said housing and having a drive shaft extending centrally through said casing, and a pump housing disposed across said casing and providing a pump chamber, seal well wall structure spanning said pump chamber and providing a seal well through which the drive shaft extends, a first rotary shaft seal disposed in said seal well to provide a seal between the shaft and the seal well, a pump impeller disposed in said chamber and secured to said shaft, said pump housing having an intake passage leading to said impeller and adapted to communicate with liquid in which said motor-pump unit is submerged and said pump housing providing a discharge passage leading from said pump chamber, the improvement wherein intermediate wall structure disposed internally of said casing provides a lubricant chamber encircling said shaft intermediate of said motor housing and said seal well wall structure for retaining a lubricant of less specific gravity than the liquid to be handled by the pump, said lubricant having a normal liquid level defining a gas pocket within an upper region of said lubricant chamber, a rotary shaft seal assembly disposed in said lubricant chamber at a region overlying much of the volume of said gas pocket to provide a seal between the motor housing and the lubricant chamber and means mounted in said lubricant chamber and responsive to rotation of said shaft to supply lubricant to the last named rotary shaft seal assembly during operation of said unit.

6. The arrangement of claim 5 wherein the last named means therein comprises a slinger cup secured on the shaft at a location in the lubricant chamber such that a portion of the slinger cup is located below the normal lubricant level and another portion of the slinger cup is located above the normal lubricant level.

7. The arrangement of claim 5 wherein said intermediate wall structure has horizontal lubricant fill passages opening into said lubricant chamber at the location of the normal lubricant level thereof.

8. The arrangement of claim 5 wherein said intermediate wall structure has lubricant drain passages opening from said lubricant chamber at the lower end thereof.

9. A submersible motor-pump unit comprising a vertical casing, a motor housing disposed in said casing with suitable side clearance therebetween to provide a generally vertical discharge passage, said housing having dome-shaped bottom wall structure provided with a central shaft opening, a motor disposed in said housing and having a vertical drive shaft projecting through and beyond said opening, pump seal well wall structure underlying and spanning said dome-shaped wall structure in spaced relation to central regions thereof and in sealed relation to edge regions thereof to define a lubricant chamber therebetween, lubricant in said lubricant chamber and having a normal liquid level therein providing a gas pocket within an upper region of said lubricant chamber, said seal well wall structure providing a seal well encircling said shaft, a pump housing secured across the lower end of said casing and providing a pump chamber beneath said seal well wall structure, said pump chamber having an inlet passage for receiving liquid in which said motor-pump unit is submerged and an outlet communicating with said discharge passage, an impeller secured on said shaft and disposed in said pump chamber, a first seal assembly disposed in said seal well and having relatively rotatable cooperating seal parts encircling said shaft, one of said parts being mounted in normally non-rotating sealing engagement with said seal well wall structure and the other of said parts being mounted in sealing engagement with said shaft and rotatable therewith, a second seal assembly disposed in said lubricant chamber adjacent the upper extremity of said pocket and having relatively rotatable cooperating seal parts encircling said shaft, one of said last-named parts being mounted in normally non-rotating sealing engagement with said dome-shaped wall structure to provide a seal about the central shaft opening therethrough and the other of said last named parts being mounted in sealing engagement with said shaft and rotatable therewith, and means mounted in said lubricant chamber and responsive to rotation of said shaft to supply lubricant to said second seal assembly during operation of said unit.

10. A submersible motor-pump unit comprising a horizontal casing, a motor housing disposed in said casing with suitable side clearance therebetween to provide a generally horizontal discharge passage, said housing having, at one end, wall structure provided with a central shaft opening, a motor disposed in said housing and having a horizontal drive shaft projecting through and beyond said opening, pump seal well wall structure spanning said end wall structure in spaced relation to central regions thereof and in sealed relation to edge regions thereof to define a lubricant chamber therebetween, a lubricant in said lubricant chamber and having a normal liquid level therein at an elevation spaced beneath said shaft to provide a gas pocket within an upper region of said lubricant chamber, said seal well wall structure providing a seal well encircling said shaft, a pump housing secured across one end of said casing and providing a pump chamber adjacent said seal well wall structure, said pump chamber having an inlet passage for receiving liquid in which said motor-pump unit is submerged and an outlet communicating with said discharge passage, an impeller secured on said shaft and disposed in said pump chamber, a first seal assembly disposed in said seal well and having relatively rotatable cooperating seal parts encircling said shaft, one of said parts being mounted in normally non-rotating sealing engagement with said seal well wall structure and the other of said parts being mounted in sealing engagement with said shaft and rotatable therewith, a second seal assembly disposed in said lubricant chamber at a region thereof spaced substantially above the normal lubricant level therein and having relatively rotatable cooperating seal parts encircling said shaft, one of said last named parts being mounted in normally non-rotating sealing engagement with said end wall structure to provide a seal about the central shaft opening therethrough and the other of said last named parts being mounted in sealing engagement with said shaft and rotatable therewith, and means mounted in said lubricant chamber and responsive to rotation of said shaft to supply lubricant to said second seal assembly during operation of said unit.

11. In a submersible motor-pump unit, elongated casing structure providing an enclosed motor chamber and a pump chamber separated by an intermediate lubricant chamber, a pump element disposed in said pump chamber, a dry type motor element disposed in said motor chamber and having a shaft projecting through said lubricant chamber and into rotatable driving connection with said pump element, a first rotary shaft seal assembly disposed in said lubricant chamber and providing a seal between said lubricant chamber and said pump chamber, a second rotary shaft seal assembly disposed in said lubricant chamber at a region at least as high as said first seal assembly and providing a seal between said lubricant chamber and said motor chamber, lubricant only partially filling said lubricant chamber to define a liquid level at an elevation located substantially below said region and thereby provide a gas pocket within the upper region of said lubricant chamber and surrounding said second rotary shaft seal assembly to enable pressure equalization between said motor chamber and said lubricant chamber, said pocket having a substantial volume thereof below said region to enable gas entrapment in said pocket to resist elevation of liquid in said lubricant chamber in the event of failure of said first seal assembly, and said unit having means maintaining lubricant at each seal assembly and including means mounted in said lubricant chamber and responsive to rotation of said shaft to direct lubricant to said second seal assembly.

References Cited in the file of this patent
UNITED STATES PATENTS

| | | |
|---|---|---|
| 2,000,581 | Coffin et al. | May 7, 1935 |
| 2,035,073 | Karrer | Mar. 24, 1936 |
| 2,320,708 | Yost | June 1, 1943 |
| 2,427,656 | Blom | Sept. 23, 1947 |

FOREIGN PATENTS

| | | |
|---|---|---|
| 551,293 | Italy | Nov. 17, 1956 |